UNITED STATES PATENT OFFICE.

ROBERT WAHL, OF CHICAGO, ILLINOIS.

MANUFACTURE OF TEMPERANCE BEER.

1,117,613. Specification of Letters Patent. Patented Nov. 17, 1914.

No Drawing. Application filed June 4, 1914. Serial No. 842,899.

*To all whom it may concern:*

Be it known that I, ROBERT WAHL, a citizen of the United States, residing at Chicago, in the county of Cook and State of Illinois, have invented a new and useful Improvement in the Manufacture of Temperance Beer, of which the following is a specification.

The object of my invention is to produce a malt beverage low in alcoholic content, (less than one-half of one per cent.), but which shall have all of the characteristics, including flavor, palatable taste, foam-stability, life, zest and keeping and nourishing qualities of good malt beers containing the full quota of alcohol, but without the intoxicating property of the latter.

To practise my improved process, I proceed in the usual or any suitable manner by mashing the malt, or treating the unmalted cereal in the ordinary way, as by cooking and mashing, drawing off and boiling and hopping the wort and introducing the latter into the fermenting vats. I add to the wort, preferably just prior to yeasting it, the acid-extracted substances of malt containing lactic acid and the peptase of the malt activated by the lactic acid, this extract being made, by preference, according to the process described in my Letters Patent No. 1,006,154, dated October 17, 1911, wherein the desired lactic acid is obtained in the beverage by the addition of lactic acid contained in a malt extract produced by extracting crushed malt with bacterial lactic acid, and added to ordinary beer wort but prepared with an extract content of 5 to 7 per cent. and preferably according to any method that yields a low percentage of sugar, to avoid excessive sweetness in the product. This yeasted wort is cooled to nearly the freezing point to arrest fermentation from the start, and is kept at that temperature for from 24 to 48 hours, or until the alcohol-content attains not more than, say, twenty one-hundredths of one per cent., or thereabout, by volume. The beer is then prepared for the market in the usual manner, as by filtering, carbonating and racking off into packages, and by pasteurization if the beer be bottled. The quantity of the liquid containing the acid-extracted substances of malt thus added to the wort should be from 3 to 5 per cent. to give the resultant product an acidity of from .05 to .1 per cent. By thus employing the acid-extracted substance of malt, and because of the lactic acid therein contained, the yeast can be kept much longer in contact with the wort without danger of producing alcohol in excess of the prescribed content, of less than one-half of one per cent., by reason of the checking influence which the lactic acid exerts on the yeast in its development. Moreover, the yeast settles more quickly than it would without this acidification, and acts in a manner similar to its action at the end of a normal fermentation, while without the acidification the yeast in fermentation arrested by chilling does not settle readily and can be removed only with difficulty. The necessity for using yeast at all is not because of the desire to produce alcohol in the beer, for it would be desirable to avoid the production of alcohol altogether in a temperance or "non-intoxicating" beer; but the addition of yeast to the wort is required to obtain the flavor of ordinary beer, which does not result in required measure from mere carbonating.

The product resulting from my present process is more desirable than other malt-beverages having an alcohol content of less than one-half of one per cent. now on the market, and which are produced by boiling out the alcohol after fermenting a malt extract or beer wort of ordinary gravity (12%) and cooling, filtering and carbonating the resultant product, or by adding to beer wort of a low degree of extract (5 to 7 per cent.) yeast, to act at low temperature thereby to check fermentation before the alcohol content reaches one-half of one per cent., then filtering and carbonating the resultant product. Beer resulting particularly from the procedure last described, involving arrested fermentation, is deficient in stability and devoid of zest for the reason that it contains a relatively large amount of albumen of an undesirable nature, which becomes eliminated, in the process of manufacturing ordinary or normal beer, in the long storage period at a temperature near the freezing point; so that such low alcoholic beer becomes cloudy or turbid when chilled in bottles, or gives sedimentation when kept at ordinary temperature for a few weeks. Such storage may not be resorted to in the practice of the present process because of the increase that would result therefrom in alcoholic content beyond the prescribed limit. Another defect incidental to the production of such beers by arrested fermentation is due to their lacking the peculiar zest which is imparted to regularly brewed and fermented beer by its content of free lactic acid and acid phosphates. The beer wort, before yeast is added, contains no free lactic acid, while some of the phosphates of the wort are contained therein in the form of primary or acid phosphates, and some in the form of secondary or neutral phosphates. Now, in alcoholic fermentation, in brewing beer, the yeast generates lactic acid, owing to the need of the yeast for potassium, with which, together with nitrogenous matter in the form of ammonia salts or amino bodies and phosphoric acid, it builds up its protoplasm. This potassium is contained in ordinary beer wort not only in the form of phosphates, as is generally accepted to be the case, but, as I have found, also in the form of lactates associated with the phosphates; and, as I have further found, during fermentation, in taking out of the lactate molecule its constituent-potassium, it leaves the lactic acid free to change the neutral potassium phosphate into acid phosphate with a surplus of free acidity of from .05 to .10 per cent. of lactic acid in the beer, which is its main zest-giving ingredient.

The defects in the low alcoholic beverages produced by both of the aforesaid known processes, due in the one case to the presence of undesirable albumen and in the other to deficiency in zest-giving property, are wholly overcome by my improvement, which involves the discovery that the acidification in normal beer-fermentation is due to the action of the yeast in freeing the lactic acid contained in the lactate of potassium.

What I claim as new and desire to secure by Letters Patent is:—

In the manufacture of beer, the process of producing the same of low alcoholic content, free from objectionable albuminoids and of a lactic acid content equivalent to the amount thereof contained in ordinary fermented beer, which consists in adding to the wort the acid extracted soluble substances of malt in solution containing the peptase of the malt and the albuminoids dissolved and peptonized by its dissolving and proteolytic actions and the acid used in extracting said malt; adding yeast to obtain the fermentation flavor; reducing the temperature of the yeasted wort nearly to the freezing point to arrest alcoholic fermentation and thereby maintain the alcoholic content below $\frac{1}{2}$ of 1 per cent.; and causing the lactic acid to change the neutral phosphates of the wort to primary phosphates with sufficient additional acid to bring the amount of free lactic acid up to that contained in normal or alcoholic beer.

ROBERT WAHL.

In presence of—
A. C. FISCHER,
F. A. FLORELL.